UNITED STATES PATENT OFFICE.

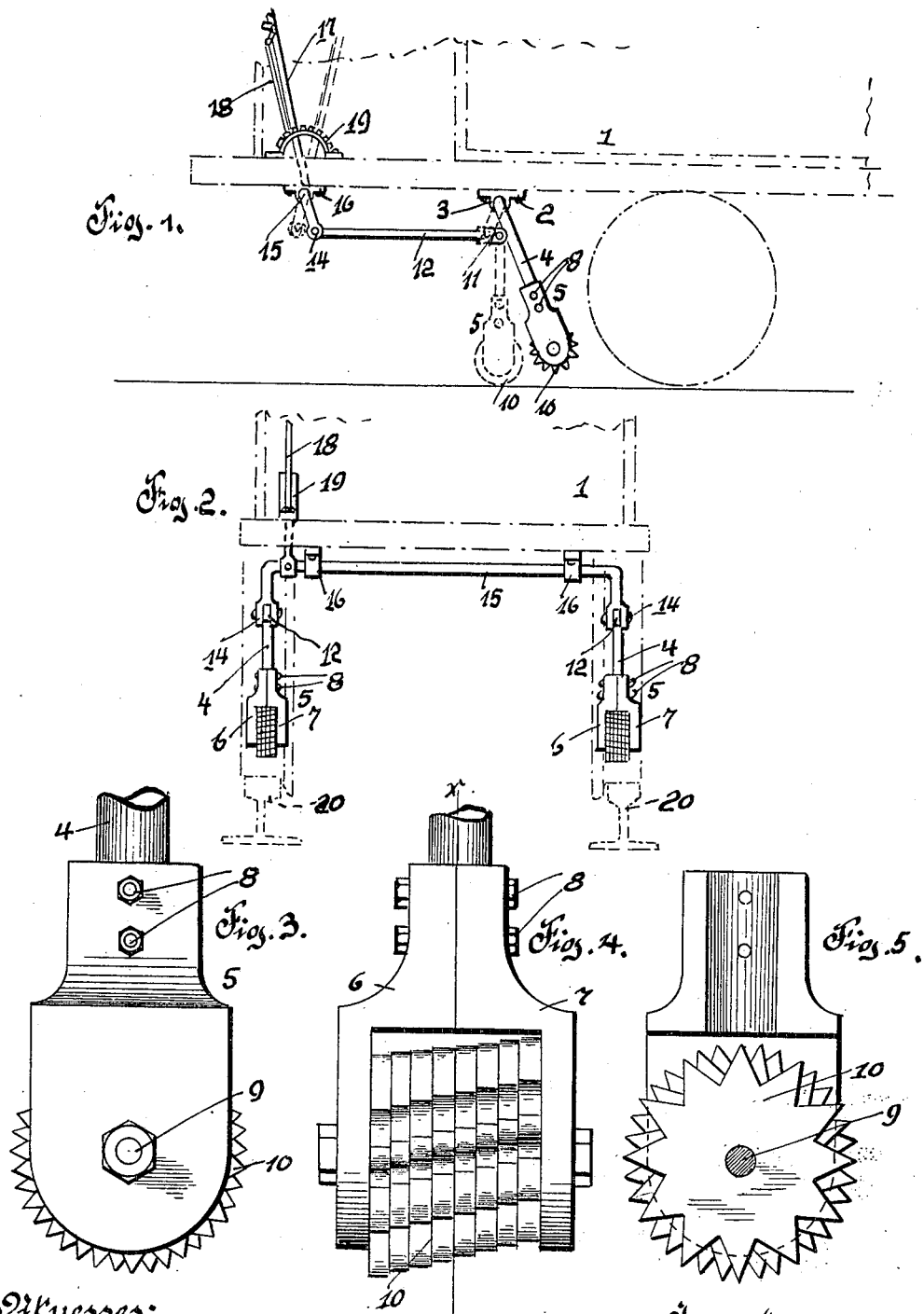

DAVID PRICE, OF McKEESPORT, AND HARRISON C. ZIMMERMAN, OF DUQUESNE, PENNSYLVANIA.

RAIL CLEANING AND ROUGHING DEVICE.

No. 825,678.        Specification of Letters Patent.        Patented July 10, 1906.

Application filed January 22, 1906. Serial No. 297,385.

*To all whom it may concern:*

Be it known that we, DAVID PRICE, residing at McKeesport, and HARRISON C. ZIMMERMAN, residing at Duquesne, in the county of Allegheny and State of Pennsylvania, citizens of the United States of America, have invented certain new and useful Improvements in Rail Cleaning and Roughing Devices, of which the following is a specification, reference being had therein to the accompanying drawings.

This invention relates to certain new and useful improvements in track cleaners and roughers; and the invention has for its primary object to provide a novel device adapted to be used in connection with street-cars for cleansing the rails upon which the car travels and insuring a positive traction between the car and said rails.

Our invention aims to provide a device which can be easily attached to the present type of car for roughening the rails over which the car travels, the invention being extremely useful in the winter-time when snow and water are frozen upon the tracks and endanger the passage of a car over said rails.

Our device may be easily and quickly actuated by the motorman or operator of a car to remove any foreign surface or ingredients from the rails, thereby preventing the wheels of a car from slipping and insuring a perfect electrical connection between the rails and the wheels of said car.

The device as constructed by us is extremely simple in construction, strong and durable, comparatively inexpensive to manufacture, and highly efficient for the purposes for which it is used.

The detail construction entering into our invention will be hereinafter more fully described and then specifically pointed out in the claims, and, referring to the drawings accompanying this application, like numerals of reference designate corresponding parts throughout the several views, in which—

Figure 1 is a side elevation of our improved device, showing the same upon the one end of a street-car. Fig. 2 is a front elevation of the same. Fig. 3 is a side elevation of a portion of the device. Fig. 4 is a front elevation of the same, and Fig. 5 is a vertical sectional view of a portion of the device.

To put our invention into practice, we provide the body of a car 1 with depending brackets 2 2 and in said brackets is journaled a shaft 3, having depending ends 4 4. Upon each of the depending ends is mounted a two-part yoke 5, the parts 6 and 7 of said yoke being secured to the depending ends 4 4 of the shaft 3 by bolts and nuts 8 or the like fastening means. Between the two parts 6 and 7 of each yoke is journaled a shaft 9, upon which is mounted a plurality of toothed disks 10, said disks being arranged whereby no two teeth will horizontally aline, consequently forming a wheel having a roughened or serrated periphery. The shaft 3 is provided with two crank-arms 11 11, which are connected by links 12 12 to the bifurcated ends 14 14 of an actuating-shaft 15, said shaft being journaled in depending brackets 16 16, carried by the body 1 of the car directly beneath the platform thereof. Connected to the shaft 15 is a lever 17, that extends upwardly through the platform of the car and is provided with a locking-lever 18, adapted to engage a segment-shaped rack 19, carried by the platform of the car.

In Fig. 1 of the drawings we have illustrated in full lines the yokes 5 as elevated above the rails 20 20, upon which the car 1 travels, while in dotted lines we have illustrated the toothed disks of said yokes as engaging the top surface of said rails. To move the toothed disks into engagement with the rails, the motorman or operator of the car throws the lever 17 rearwardly, which through the medium of the actuating-shaft 15, links 12 12, and the shaft 3 swings the yokes directly beneath the brackets 2 2, causing the toothed disks to impinge the rails 20 20 and remove foreign surfaces or ingredients that may adhere to the said rails 20 20. The teeth of the disks 10, carried by each yoke, are adapted to roughen the rails and increase the traction between the car and said rails, also preventing the wheels of a car from slipping upon the rails. We do not care to confine ourselves to the number of toothed disks employed in connection with each yoke or to the number of teeth formed in each disk, and such changes as are permissible by the appended claims may be resorted to without departing from the spirit and scope of the invention.

What we claim, and desire to secure by Letters Patent, is—

1. The combination with a car, of a shaft journaled beneath said car and having depending ends, two-part yokes secured to the ends of said shaft, a plurality of toothed disks mounted in each yoke, an actuating-shaft journaled beneath said car and having depending ends, links connecting said shafts, a lever connected to said actuating-shaft, and extending through the platform of a car, means to lock said lever in a fixed position, substantially as described.

2. In a track cleaner and rougher, a plurality of toothed cleaning and roughing disks mounted on a common shaft, each disk being mounted eccentrically to the axis of each of the other disks.

3. In a track cleaner and rougher, a rock-shaft having depending ends, a plurality of toothed cleaning and roughing disks carried by each of said ends, each of said set of disks mounted on a common shaft, and each disk being eccentric to each of the other disks of its set.

4. In a track cleaner and rougher, a rock-shaft having depending ends, a plurality of toothed cleaning and roughing disks carried by each of said ends, each of said set of disks mounted on a common shaft, and each disk being eccentric to each of the other disks of its set, and means for actuating said rock-shaft.

5. In an apparatus of the class described, a cutter composed of a multiplicity of cutting-disks arranged side by side, and eccentrically mounted one to the other, and separately rotatable on one axle, an axle supporting said disks, and means to support the axle.

6. In an apparatus of the class described, a cutter composed of a plurality of cutting-disks, each separately rotatable on a common axle and arranged eccentrically one to the other.

In testimony whereof we affix our signatures in the presence of two witnesses.

DAVID PRICE.
HARRISON C. ZIMMERMAN.

Witnesses:
JAS. G. McCAUGHAN,
JOHN F. MANN.